(12) United States Patent
Bjerregaard (10) Patent No.: US 7,827,338 B2
(45) Date of Patent: Nov. 2, 2010

(54) METHOD OF AND A SYSTEM FOR CONTROLLING ACCESS TO A SHARED RESOURCE

(75) Inventor: Tobias Bjerregaard, Frederiksberg (DK)

(73) Assignee: Teklatech A/S, Lyngby (DK)

( * ) Notice: Subject to any disclaimer, the term of this patent is extended or adjusted under 35 U.S.C. 154(b) by 141 days.

(21) Appl. No.: 11/885,182

(22) PCT Filed: Feb. 28, 2006

(86) PCT No.: PCT/DK2006/000119

§ 371 (c)(1),
(2), (4) Date: May 19, 2008

(87) PCT Pub. No.: WO2006/089560

PCT Pub. Date: Aug. 31, 2006

(65) Prior Publication Data

US 2009/0043934 A1 Feb. 12, 2009

Related U.S. Application Data

(60) Provisional application No. 60/656,377, filed on Feb. 28, 2005.

(30) Foreign Application Priority Data

Feb. 28, 2005 (DK) ............................... 2005 00304

(51) Int. Cl.
*G06F 13/14* (2006.01)
*G06F 12/00* (2006.01)
(52) U.S. Cl. ...................................... 710/244; 710/241

(58) Field of Classification Search ................. 710/241, 710/244
See application file for complete search history.

(56) References Cited

U.S. PATENT DOCUMENTS

| 5,917,804 | A | * | 6/1999 | Shah et al. | 370/230 |
| 6,643,293 | B1 | * | 11/2003 | Carr et al. | 370/399 |
| 6,804,738 | B2 | * | 10/2004 | Weber | 710/244 |
| 6,862,265 | B1 | * | 3/2005 | Appala et al. | 370/235 |
| 7,191,273 | B2 | * | 3/2007 | Weber | 710/244 |
| 2004/0001502 | A1 | | 1/2004 | Garmire et al. | |
| 2004/0081165 | A1 | * | 4/2004 | Carr et al. | 370/395.21 |

OTHER PUBLICATIONS

Felicijan T et al., "An Asynchronous On-Chip Network Router with Quality-of-Service (QoS) Support", SOC Conference, Univ. Manchester, Manchester, UK, pp. 274-277 (2004).
Felicijan T et al., "An Asynchronous Low Latency Arbiter for Quality of Service (QoS) Applications", Microelectronics, pp. 123-126 (2003).

(Continued)

*Primary Examiner*—Ryan M Stiglic
(74) *Attorney, Agent, or Firm*—Harness, Dickey & Pierce, P.L.C.

(57) ABSTRACT

A method and a system of controlling access of data items to a shared resource, wherein the data items each is assigned to one of a plurality of priorities, and wherein, when a predetermined number of data items of a priority have been transmitted to the shared resource, that priority will be awaiting, i.e. no further data items are transmitted with that priority, until all lower, non-awaiting priorities have had one or more data items transmitted to the shared resource. In this manner, guarantees services may be obtained for all priorities.

22 Claims, 5 Drawing Sheets

OTHER PUBLICATIONS

Bjerregaard T et al., "Virtual Channel Designs for Guaranteeing Bandwidth in Asynchronous Network-on-Chip", Norchip Conerence, pp. 269-272 (2004).

Zhang H et al, "Rate-Controlled Static-Priority Queueing", Networking: Foundation for the Future, San Francisco, pp. 2c.3.1-2c.3.10(Mar. 28-Apr. 1, 1993).

* cited by examiner

METHOD OF AND A SYSTEM FOR CONTROLLING ACCESS TO A SHARED RESOURCE

PRIORITY INFORMATION

This application is a National Stage Application of PCT/DK2006/000119 which claims the benefit of priority on U.S. Provisional Application No. 60/656,377 filed Feb. 28, 2005; and Danish Patent Application number PA 2005 00304 filed Feb. 28, 2005.

The present invention relates to the controlling of access to a shared resource, and in particular the controlling in order to provide pre-determined guarantees for data transport to the shared resource.

BACKGROUND

Technologies of this type may be seen in: US 2004/001502, "An asynchronous on-chip network router with quality-of-service (QoS) support", Felicijan T et al, SOC conference, 2004, proceedings. IEEE, International Santa Clara, Calif., USA, Sep. 12-15, 2004, Piscataway, N.J., USA, IEEE, pp 274-77, "An asynchronous low latency arbiter for quality of service (qos) applications", Felicijan T et al, microelectronics, 2003, ICM 2003, Proceedings of the $15^{th}$ international conference on Cairo, Egypt, Dec. 9-11, 2003, Piscataway, N.J., USA, IEEE, pp 123-26, "Virtual channel designs for guaranteeing bandwidth in asynchronous network-on-chip", Bjerregaard T et al, Norchip conference, 2004, proceedings, Oslo, Norway, 8-9 Nov. 2004, Piscataway, N.J., USA, IEEE, pp 269-272, "Rate-controlled static-priority queueing", as well as in Zhang H et al, Networking: foundation for the future, San Francisco, Mar. 28-Apr. 1, 1993, Proceedings of the annual joint conference, on the computer and communications societies (INFOCOM), Los Alamitos, IEEE Comp. Soc. Press, US, vol. 2, conf. 12, pp 227-236.

The problem seen in a number of data transport applications is that an amount of data is to be transported to a shared resource, such as a link or a memory, and that not all this data may be transmitted at the same time. Thus, a decision must be made as to what data is transmitted first and which data must wait. Naturally, this decision has an impact on the transport, such as the latency, of the data toward the shared resource, and subsequently on the performance of the application in which the resource takes part.

SUMMARY

Example embodiments provide a novel manner of scheduling the data directed at the shared resource such that guarantees with regards to latency and bandwidth may be obtained.

In a first aspect, example embodiments relate to a method of controlling access to a shared resource, the method comprising:
receiving information relating one or more data items to be transmitted, each data item having assigned thereto one of a plurality of different, predetermined priorities, and
repeatedly providing items to the resource by:
   transmitting a data item to be transmitted having a highest, non-awaiting priority to the resource and
   that priority subsequently awaiting a transmission of a data item from each non-awaiting, lower priority for which information, relating to a data item to be transmitted, has been received.

In general, the data items may be any type of data items, such as Ethernet packets, flits (flow control units), or parts thereof. Each data item may be handled and prioritized alone, or a larger amount of data may be prioritized and subsequently split up into data items.

The priority of the data may be pre-determined, determined from contents of the data item or a larger amount of data from which the data item was derived. Alternatively, the priority may be determined from a source thereof or a recipient thereof.

In the present context, the priority may be represented in any manner desirable. Due to the present invention normally being implemented in an electrical circuit, a numeral, such as an integer, representing the priority is normally used. This, however, is not a requirement even for electrical circuits.

In general, an order of the priorities is determined in order to be able to determine from any pair of the priorities, which is the higher and which is the lower. This is independently of the actual manner of representing the priorities. In the present context, the priorities may be represented in any manner, and the order thereof (which is higher than others) may be determined in any manner.

The receiving step may receive the data alone (and then determine the priority thereof), the priority only, or both the data and the priority assigned. Further below, different aspects of these manners of receiving the information are described.

Presently, the shared resource may be any type of resource adapted to receive data, such as a memory, a link, a processor, and/or a crossbar.

The present invention relates to a manner of controlling the transmission of data items to the shared medium, not focussing on the individual data items but controlling the flow of data items on the basis of the priorities.

A priority may be awaiting or not. Awaiting means that no data with that priority may be transmitted to the shared resource at this point in time. A priority may be awaiting even if no data items with that priority desire transmission to the shared resource (that is, information has been received indicating that such data items are ready for transmission).

Preferably, the non-awaiting lower priorities which a certain priority must await are those which are non-awaiting at the point of transmission of the data item with the pertaining priority.

At any point in time, the next data item to be transmitted to the resource is a data item:
being ready for transmission (i.e. for which information has been received),
having a priority which is not awaiting, and
having the highest priority of the non-awaiting priorities for which data items are ready.

Once that data item is transmitted, that priority will be awaiting until all lower priorities, which are not awaiting and for which data are ready for transmission, have had the opportunity to transmit a data item to the shared resource.

It should be noted that while a priority is awaiting, data items may become ready for transmission relating to other priorities which are lower than the awaiting priority. The awaiting priority need not await a transmission also from such priorities.

It may be desired that a record is kept for each priority in relation to which lower priorities must transmit before the present priority again may transmit.

It is noted that even though the highest priority is preferably only allowed transmission at least once each time all lower (all other) non-awaiting priorities have transmitted a data item, a certain guarantee for all priorities is obtained both as to latency and as to the bandwidth obtainable. In addition, it is noted that the data item transmission to the shared resource may be optimum (such as the full capability of a link) independently of which priorities actually transmit data items. This is seen in that a priority can only be awaiting if data items assigned other priorities are ready for transmission. If only a single priority has data items to be transmitted, this priority will not be awaiting, and the data items may be transmitted to the shared resource one by one.

One manner of providing the data items is one further comprising the step of providing a plurality of queues each relating to one of the priorities, and wherein:
the receiving step comprises receiving each data item in a queue relating to the priority assigned to the data item,
the transmitting step comprises transmitting the data item from a non-awaiting queue having the highest priority, and
the awaiting step comprises that queue then awaiting a transmission of a data item from all non-empty non-awaiting-queues having a lower priority.

Thus, the data items are received and provided into queues relating to the pertaining priorities.

In that connection, the awaiting step then could comprise forwarding, when a data item from each lower priority non-empty and non-awaiting queue has been transmitted from a data provider to the shared resource, a next data item from the queue to a memory, and wherein the transmitting step comprises transmitting that data item in the memory having the highest priority.

This simplifies the process in that the awaiting status and the determination of which data item to transmit are separated further. In this embodiment, the memory simply holds a data item for each non-empty queue which is non-awaiting. Thus, it is simple to determine which of those data items is to be transmitted.

In fact, the same memory structure may be used not for the actual data items but for the information relating to the data items in order to make it visible which priorities are awaiting and facilitate easy determination of the next priority which is adapted to transmit.

An awaiting queue may be prevented from transmitting data items to the memory, so that non-empty queues not having a data item in the memory will be awaiting queues.

In another embodiment, the method further comprises the step of providing a plurality of data providers each being adapted to:
provide data items each having assigned thereto one of the priorities,
provide information relating to one or more data items ready to be transmitted from the data provider to the shared resource, and wherein:
the transmitting step comprises a data provider transmitting the data item to the resource and
the awaiting step comprises preventing transmission of ready data items, having the awaiting priority, from any data provider, until a data item from each non-awaiting, lower priority has been transmitted from a data provider to the shared resource.

In this situation, the method, or the system carrying out the method, may not have or receive the data but is adapted to instruct data providers (which inform the method of data items for transmission) of when to transmit a data item (and preferably also an identity of priority thereof in order for the provider to determine which of a number of data items to transmit).

In one manner, the awaiting step actively prevents a data provider, such as by transmitting a preventing signals, from transmitting a data item of an awaiting priority. Alternatively, the providers are adapted to not transmit data items before being instructed to do so. This may be when the data providers are further be adapted to forward data items when instructed accordingly, and wherein:
the transmitting step comprises instructing a data provider, having a ready data item of the highest, non-awaiting priority, to forward the data item to the shared resource and
the awaiting step comprises not instructing data providers having a ready data item of the awaiting priority to transmit any data items of the awaiting priority.

In general, the receiving step preferably comprises receiving the data items and providing the data items into a storage or memory, and wherein the transmitting step comprises transmitting the data item from the storage or memory.

In one embodiment, the awaiting step comprises, for a predetermined priority, awaiting the transmission(s) of the data item(s) only when the predetermined priority has transmitted a plurality of data items. In this manner, this predetermined priority will be offered a larger bandwidth to the resource than if only a single data item was transmitted each time before the priority went into the awaiting stage.

In this situation, any memory holding data items to be transmitted to the resource for non-awaiting queues may have space for the plurality of data items for the predetermined priority and less for other priorities.

In another aspect, the invention relates to a method of controlling access to a shared resource, the method comprising:
receiving information relating one or more data items to be transmitted, each data item having assigned thereto one of a plurality of different, predetermined priorities,
defining, for each priority, one ore more transmission processes, each piece of information relating to a data item being assigned a transmission process of the pertaining priority, and
repeatedly providing items to the resource by:
transmitting, to the resource, a data item, information relating to which has been assigned to a non-awaiting transmission process defined for a highest priority, and
that transmission process subsequently awaiting a transmission of a data item from each lower priority to which information, relating to a data item to be transmitted, has been assigned and of which at least one transmission process is non-awaiting.

This aspect is closely related to the first aspect, but in this aspect, several transmitting means, obeying the transmission characteristic of the first aspect, may be defined for one or more priorities. In this manner, that priority may obtain a larger bandwidth while still providing determinable and realistic service guarantees for the other priorities.

Again, a wide variety of behaviours may be obtained by controlling to which transmission process to assign received information and which transmission process is selected for the transmission of the data item. Also, the point in time of assigning received information to a transmission process will determine the behaviour of the system. Preferably, the information is assigned that transmission process which will have the pertaining data item transmitted the earliest.

In one embodiment, that transmission process subsequently actually awaits a transmission of a data item from each non-awaiting transmission process of lower priority to which information, relating to a data item to be transmitted, has been assigned.

In general in the first and second aspects, the priority/queue/transmission process preferably awaits transmission only of a data item of which information has been received at the point of time of transmission of the data item transmitted at the point in time. Thus, in these aspects, the determination of which queues, transmission processes, or priorities are non-awaiting and non-empty is preferably performed at the point in time of transmission of the data item. In one manner, a memory is assigned to each priority, and that memory may be fed with information of the non-empty, awaiting lower priorities, which should transmit a data item, before this priority is again non-awaiting. This memory may then be updated at each transmittal of a data item.

Another aspect of the invention relates to a system for controlling access to a shared resource, the system comprising:

receiving means adapted to receive information relating one or more data items to be transmitted, each data item having assigned thereto one of a plurality of different, predetermined priorities, and transmitter means adapted to repeatedly have data items provided to the resource by:
 a having a data item to be transmitted, and having a highest, non-awaiting priority, transmitted to the resource and
 subsequently having a transmission of a data item from that priority, wait until a data item has been transmitted with each of the non-awaiting, lower priorities for which information, relating to a data item to be transmitted, has been received.

As mentioned above, the receiving means may receive the actual data items and itself determine the pertaining priority, it may receive both the data item and the priority, or it may receive only the priority.

In one overall embodiment, the system further comprises a plurality of queues each relating to one of the priorities, and wherein:

the receiving means is adapted to provide each data item into a queue relating to the priority assigned to the data item, the transmitter means is adapted to transmit the data item, having the highest, non-awaiting priority, from that of any non-awaiting queues having the highest priority, and subsequently have that queue await a transmission of a data item from all non-awaiting queues relating to a lower priority.

Then, the transmitter means may be adapted to forward, when a data item from each non-awaiting, lower priority has been transmitted from a queue to the shared resource, a next data item from the queue to a memory, and to transmit that data item in the memory having the highest priority to the resource.

As mentioned above, a memory of that type may in addition or alternatively be used for the information received in a manner so that information is only received in the memory for non-awaiting priorities in order to facilitate a fast determination of the next priority to send a data item.

In the same or another embodiment, the system may further comprise a plurality of data providers each being adapted to:
provide data items each having assigned thereto one of the priorities, and
provide the information relating to one or more data items ready to be transmitted from the data provider to the shared resource, wherein the transmitter means is adapted to instruct a data provider to transmit the data item, having the highest, non-awaiting priority, to the resource and to subsequently prevent transmission of ready data items having the awaiting priority from any data provider, until a data item from each non-awaiting, lower priority has been transmitted from a data provider to the shared resource.

In this respect, the data providers may be adapted to forward data items when instructed accordingly, and wherein the transmitter means is adapted to instruct a data provider, having a ready data item of the highest, non-awaiting priority, to forward the data item to the shared resource and subsequently not instruct data providers having a ready data item of the awaiting priority to transmit any data items of the awaiting priority, until the data providers have been instructed to transmit a data item from each non-awaiting, lower priority. (evt. Instruere alle og ikke kun dem der har et data item med denne prioritet)

In general, the receiving means is preferably adapted to receive the data items and providing the data items into a storage or memory, and wherein the transmitter means is adapted to transmit the data item from the storage or memory.

In the present context, the shared resource may be any type or resource or receiver which is adapted to receive data items, such as a link, a memory, a processor, an integrated circuit, or a crossbar.

As mentioned above, a larger bandwidth may be offered to a predetermined priority when the transmitter means are adapted to have a priority await only after a plurality of data items from the priority have been transmitted to the resource.

In a fourth aspect, the invention relates to a system for controlling access to a shared resource, the method comprising:

receiving means adapted to receive information relating one or more data items to be transmitted, each data item having assigned thereto one of a plurality of different, predetermined priorities, for each priority, one ore more transmission processes, each piece of information relating to a data item being assigned a transmission process of the pertaining priority, and transmitter means adapted to repeatedly have data items provided to the resource by:
 a having a data item to be transmitted, information relating to which has been assigned to a non-awaiting transmission process of a highest priority, transmitted to the resource and
 subsequently having that transmission process subsequently await a transmission of a data item from each lower priority to which information, relating to a data item to be transmitted, has been assigned and of which at least one transmission process is non-awaiting.

As mentioned above, this provides an additional manner of controlling the flow of data items and of providing the priorities with determinable and controllable transmission guarantees.

In one embodiment, the transmitter means is adapted to subsequently have that transmission process subsequently await a transmission of a data item from each non-awaiting transmission process of lower priority to which information, relating to a data item to be transmitted, has been assigned.

Also, in the third and fourth aspects, the transmitter means is preferably adapted to have the priority/queue/transmission process await transmission only of a data item of which information has been received at the point of time of transmission of the data item transmitted at the point in time. This makes the process easier to control when the point in time of the determination is fixed.

BRIEF DESCRIPTION OF DRAWINGS

In the following, a preferred embodiment of the invention will be described with reference to the drawing, wherein.

DETAILED DESCRIPTION OF EXAMPLE EMBODIMENTS

The present embodiment shows how the invention (in the following called ALG—Asynchronous Latency Guarantee) can be used as a link scheduler in an asynchronous on-chip network (Network-on-Chip, NoC). The guaranteed services (GS) provided by ALG are not inversely dependent on each other, thus ALG overcomes the limitations of bandwidth (BW) allocation schemes based on time division multiplexing (TDM), and supports a wide range of traffic types characterized by different GS requirements. At opposite ends of the GS spectrum; ALG supports both latency critical, low BW traffic such as interrupts, but also streaming data, which does not have stringent latency requirements but requires GS in terms of BW. In addition, ALG operates in a completely asynchronous environment. We demonstrate with a low area 0.12 µm CMOS standard cell implementation.

The rest of the description is organized as follows. Section 1 looks at the background of GS, addressing current solutions, and defining the requirements for an optimal solution in NoC. Section 2 explains the concepts of ALG scheduling and provides proof of its functionality, and Section 4 extends the proof given in Section 3 to account for buffer limitations as well. Section 4 relates to bandwidth allocation in this scheme. In Section 5, an implementation of an on-chip ALG link is given, and in Section 6 simulation results are provided.

1. Guaranteed Services

In the following, network performance parameters are discussed and a taxonomy is established. We then argue for the need for connection-oriented routing and discuss GS schemes used in current NoC and in macro networks, and finally we propose a set of requirements for GS in NoC.

1.1. Performance Parameters

Service guarantees are quantified in terms of one or more performance parameters. In order to appropriately specify service bounds, both BW and latency must be indicated. A latency guarantee is useless, if the throughput which can be sustained is too small, likewise a BW guarantee is useless without bounds on the latency incurred.

While the BW bound of a stream of flits is determined by the bottleneck in its path, the total latency of a flit in a network is characterized by the sum of latencies encountered. These include the network admission latency $t_{admit}$, during which the required network connection is accessed, and a number of hop latencies, a hop being the flit movement from the buffer in one routing node, across a link and into the buffer in the neighbouring routing node. The hop latency consists of an access latency $t_{access}$, the time it takes for the flit to be granted access to the shared routing resources, e.g. the link, plus a transmission latency $t_{link}$, the time it takes to transmit the flit to the buffer in the next routing node, once access has been granted. The total latency, of a flit traversing a path which is X hops long, is thus $t_{total} = t_{admit} + t_{access1} + t_{link1} + \ldots + t_{accessX} + t_{linkX}$.

1.2. Connection-Oriented GS

In order to provide hard service guarantees, connection oriented routing is absolutely essential. In connection-less routing, all data travels on the same logical network, and any transmission can potentially stall another. GS traffic must be logically independent of other traffic in the network. Hard bounds on service guarantees are beneficial from a system-level point of view in that they promote a modular design flow. Without such guarantees, a change in the system may require extensive top-level re-verification. Thus GS in NoC holds the potential to reduce turn-around-time of large SoC designs. Also, while formal verification of the performance of BE routing networks is often not possible—as desirable in critical real-time systems—GS makes it so.

1.3. GS Schemes

The basic solution to providing BW guarantees is based on fair fluid queuing (FFQ). FFQ is a general form of head-of-line processor sharing (HOL-PS), which implements separate queues for each connection. The heads of the queues are serviced in a manner such as to provide fair-share access to the shared media, e.g. a link.

In an asynchronous NoC, FFQ-type access schemes have the unpleasant drawback of a very high worst case latency. A tree-arbiter can approximate FFQ, however since nothing can be said concerning the timing of the inputs with respect to each other, any packet arriving on a given channel, potentially has to wait for all other inputs before being serviced. Thus the worst case latency accumulated across a sequence of links in an asynchronous NoC implementing this link access scheme is very high. Also, the access time is inversely proportional to the BW reservation. To get low latency, a large portion of the BW must be reserved. In globally synchronous NoCs, the latency through the network can be guaranteed to one clock cycle per hop, however the latency in accessing a connection at the source is still inversely proportional to the reserved BW. Also, in order to realize such a low per-hop latency, explicit end-to-end flow control mechanisms are required, as the connections are not independently buffered. To provide better bounds on the latency, decoupled from the BW guarantees, a different scheme is needed.

Macro networks are of a globally asynchronous nature, since it is obviously not possible to implement clock level synchronization among network nodes in a wide area network. This makes them somewhat similar to asynchronous NoC. In employing FFQ-type solutions to GS, latency problems as described above for asynchronous NoC are a well known drawback. To overcome these drawbacks, rate controlled static priority (RCSP) scheduling is often used. In RCSP, an admission controller assigns an eligible transmission time to all incoming packets. When this point of time arrives, the packets are queued in a static priority queue (SPQ). This way not only BW guarantees but also latency guarantees can be provided, independently of each other. The admission control however requires that the node has a local notion of time. This makes it unsuitable for implementation in an asynchronous NoC. Another drawback of the method is that it is nonwork-conserving, meaning that the router may be idle, even though there are packets in the channel queues, waiting for their eligible transmission time. This reduces the efficiency of using the available network resources, and even if the latency bounds are respected, the average connection latency and the link utilization are reduced.

1.4. Requirements for GS in NoC

Our proposal to the requirements of a solution for GS in a NoC is that it (i) is simple in order to facilitate high operation speed and low hardware overhead, (ii) is work conserving in order to make efficient use of network resources, and (iii) can provide bounds on latency and BW which are decoupled, or at least not inversely dependent on each other. Additionally a requirement to a solution for GS in an asynchronous NoC is that it (iv) does not require a notion of time, neither local nor global. ALG conforms to all of these requirements, and is thus a valid solution to providing GS in both synchronous and asynchronous systems.

In Section 3 we explain the ALG scheduling discipline, demonstrating its use in providing latency and BW guarantees on a shared link. Note however that ALG-based access can be applied to any shared media. Also, though our implementation is based on asynchronous circuits, ALG is not restricted to such. However, the fact that ALG does not require a notion of time makes it particularly suitable for asynchronous systems.

2. Basic ALG Scheduling

In this section we explain the basic ALG scheduling discipline. We first provide an intuitive understanding of its workings, and thereafter prove formally that it works. All indications of time in the following are quantized using the time unit flit-time. A flit-time is defined as the time it takes to complete one handshake cycle on the physical link. VC control measures ensure that no flits will stall on the link, thus the duration of such a handshake is well defined. The circuits being asynchronous, naturally the flit-time is not constant throughout the entire network. However we assume the flit-time to be fairly uniform.

Figure 3:
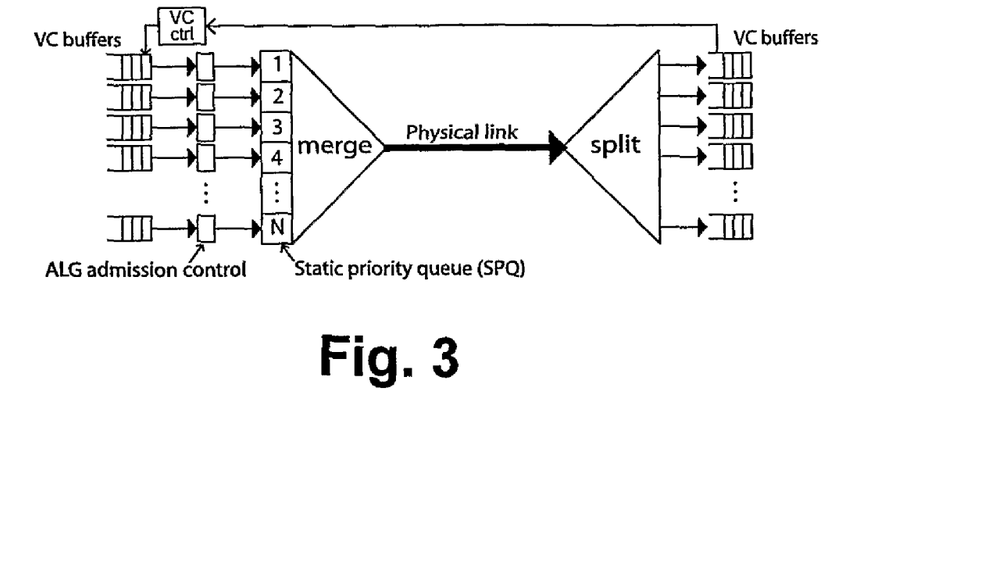
FIG. 3 illustrates a complete link according to the preferred embodiment wherein the static priority queue (SPQ) prioritizes access to the link, providing latency guarantees, the admission control makes sure that the flow of flits adheres to the conditions required by the SPQ, and the VC control ensures non-blocking behaviour.

FIG. 3 shows the complete ALG link. The ALG admission control and the static priority queue (SPQ) implement the ALG scheduler. The VC control wraps around these. How these three sub-systems work together to provide latency and BW guarantees across multiple VCs sharing a physical link will become clear in the following. The principles of ALG scheduling are best understood from the inside out. The SPQ prioritizes VCs, providing latency guarantees accordingly, but only under certain conditions. The admission control makes sure that these conditions are met. The VC control mechanism ensures that flits are transmitted on the shared link only if there is free buffer space at the receiving end, thus preventing flits from stalling on the link and invalidating the latency and BW guarantees.

2.1. Prioritized Channels

Figure 1:
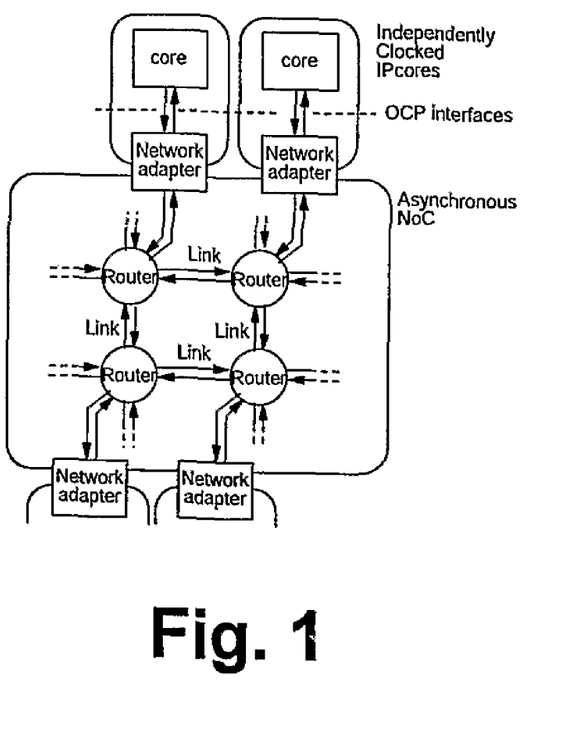
FIG. 1 illustrates an asynchronous network connecting independently clocked cores facilitates modularity in large scale SoC designs.
Figure 2:
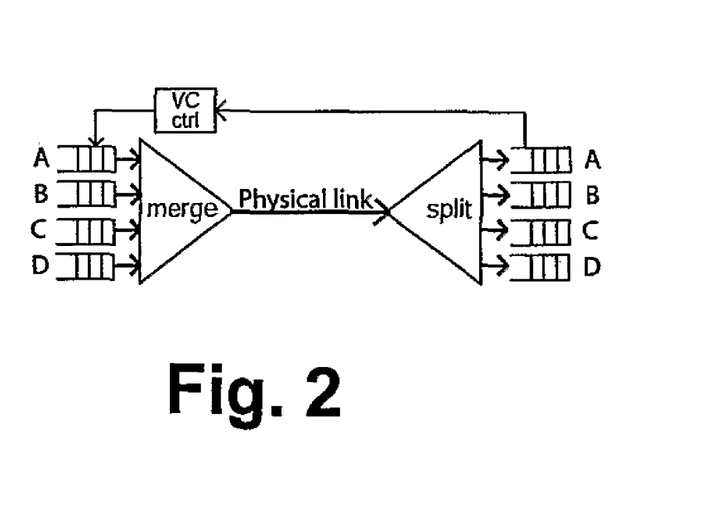
FIG. 2 illustrates a basic link in which virtual channels A to D share a physical link.

In order to provide a latency guarantee, it is necessary to provide bounds on the link access time. Looking at FIG. 2, envision flits arriving on channels A to D at random but large intervals. Now consider the channels being serviced by priority, A having the highest priority. Flits arriving on A will always be serviced immediately, thus it is guaranteed that the maximum link access time is one flit-time, i.e. the time it would take to finish a potentially on-going transmission. Since we—at this point—make the simplifying assumption that there is a large interval between flits arriving on A, flits arriving on B will wait for A no more than once before they are serviced. Thus flits on B will be delayed a maximum of two flit-times, since they will maximally wait for an on-going transmission to finish and for a transmission on A. Likewise, C will wait a maximum of three flit-times, etc. As a result, the maximum link access time is proportional to the priority of the channel. This is the functionality that is implemented by the SPQ in FIG. 3.

2.2. Admission Control

The discipline explained above requires a large flit interval. This is not always possible to guarantee, in particular in an asynchronous network with distributed routing control. Even if a specific flit interval is provided at the source, the network may introduce jitter to the data stream, causing the interval requirement to be invalidated somewhere inside the network. This necessitates an admission control stage, which regulates admission to the SPQ. In FIG. 3, the ALG admission control is illustrated as boxes in front of the SPQ. This is somewhat similar to RCSP used in macro networks, in that it also implements an admission control stage and an SPQ. In RCSP however, admission is based on the local timing of the channels (an eligible transmission time is scheduled for each priority). This is not possible in a fully asynchronous system, which has no notion of time at all.

The condition, to be implemented by the ALG admission control for the latency bounds of the SPQ not to be invalidated, is that a flit on a given (higher priority) VC can stall a flit in another (lower priority) VC only once. This can be achieved by looking at the flits waiting in the SPQ when a flit is contending for access on a given VC. In order not to invalidate the latency guarantee of flits on lower priority VCs, all flits that have been waiting while the preceding flit on the given VC was prioritized in the SPQ, must be serviced before a new flit is admitted. This is ensured by sampling the occupation of the SPQ when a flit is being transmitted on the link. Once all the flits waiting in the SPQ at this point of time have been serviced, a new flit on the same VC can be admitted. Thus flits on VCs of lower priority will be stalled a maximum of one flit-time by flits on each higher priority VC. Note that when a given flit is granted access to the link there will only be flits waiting on lower priority VCs, since by definition of the SPQ functionality, all flits on higher priority VCs will have already been serviced.

Figure 4:
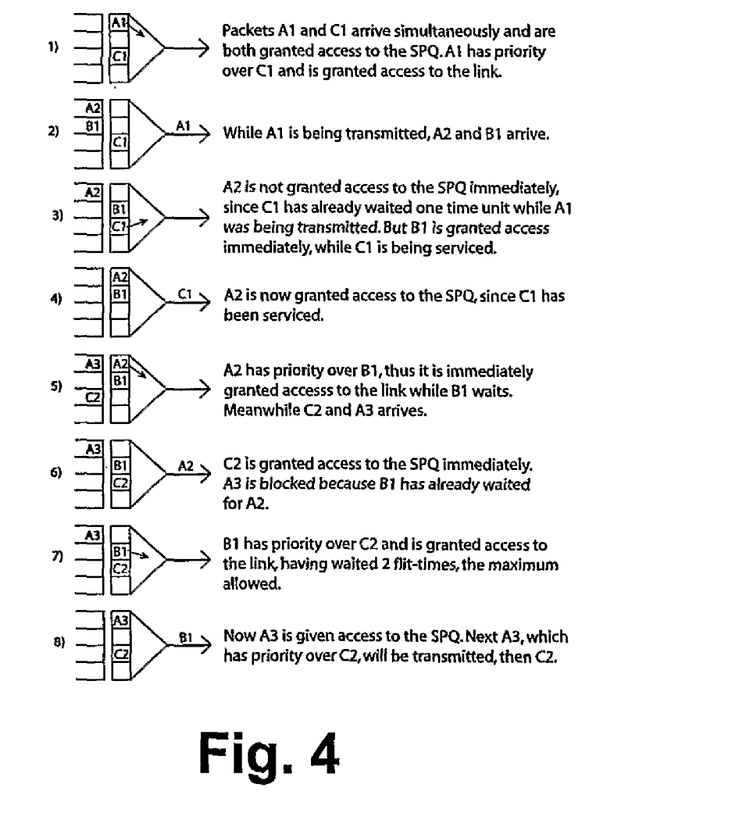
FIG. 4 illustrates an operational example of the link of FIG. 3.

FIG. 4 illustrates ALG by example. It is seen how the latency guarantee of the B and C queues are being met. The A queue has too many flits coming in, and is thus being inhibited by the admission control. The reason for the burst on A might be found at an earlier point in the network, due to A flits being transmitted very quickly (faster than the guaranteed latency bound) on previous links.

2.3. Latency and Bandwidth Guarantees of ALG

In this section we will state the latency and BW guarantees provided by a basic ALG connection. The results will be deducted formally in Section 3.4. The service guarantees of ALG are characterized by the priority level of each VC reserved for the connection, as well as the total number of VCs on each link. Consider a connection for which the VCs with priority levels $Q1, Q2, \ldots, QX$ have been reserved on a sequence of ALG links $1, 2, \ldots, X$. Each link implements N VCs. The links provide a bound of $Q1, Q2, \ldots, QX$ flit-times on the link access time. This is so, under the condition that a flit interval of $tinterval \geq N + Qmax - 1$ flit-times is respected at the source, $Qmax$ being the maximum Q value on the sequence of VCs. This is the so called interval condition, which will be derived in Section 4.4. The interval condition is also an access rate guarantee for the connection, and as such characterizes the BW guarantee of the connection, in terms of a fraction of the full link capacity: BWmin=BWmin[Qmax]=BWlink/(N+Qmax−1).

The important point is to note the fact that the latency guarantee provided by ALG is decoupled from the BW guarantee. Increasing N, the number of VCs on a link, the BW guarantee can be made arbitrarily small while still maintaining a link access time of down to one flit-time. Thus latency critical connections with low BW needs, e.g. interrupts, are supported without the need to over-allocate BW.

Although existing (synchronous) GS disciplines for NoC based on TDM-type BW allocation realize a one flit-time per hop latency, the initial connection access latency still causes the total end-to-end latency to be inversely proportional to the BW guarantee. ALG provides instant access to the GS connection, as long as the interval condition is met. Also one may note that the forward latency per stage in an asynchronous network can be made very small, much less than a clock cycle of a comparable synchronous circuit. Thus while ALG guarantees a bound on the latency, an asynchronous NoC also potentially has a much lower minimum latency. In this lies a major advantage of implementing NoC using asynchronous versus synchronous circuits.

2.4. Proof

In the following we will prove that if the interval condition is respected at the source, a bound on the end-to-end connection latency can be made. The admission control might hold a flit, but only if the flit is ahead of its global schedule, causing the flit intervals observed locally to be shortened. The proof consists of two parts. In the first part we prove that the ALG discipline works for a single link. We first show that the first flit transmitted on a connection meets its latency requirements, or makes its deadline. Then we show that any flit following a flit that made its deadline, and which adheres to the interval condition, will also make its deadline, and from this we reach the value of the interval. By induction, all flits adhering to the interval condition make their deadlines. In the second part of the proof, we prove that for a sequence of ALG links a flit will make its deadline at each link, if the interval condition is respected at the source. Thus the end-to-end latency for the connection is bounded by the sum of the latency guarantees on each link, regardless of the interval condition being invalidated inside the network.

The Single Link Theorem: On an ALG link implementing N VCs, all flits on VC Q will be guaranteed a maximum link access time of Q flit-times under the flit interval condition of tinterval≧N+Q−1 flit-times.

Proof: Take a given link implementing N VCs each corresponding to a priority level 1, 2, 3, ... N in the SPQ. The first flit arriving on a given VC Q ∈ {1, ..., N} will be granted access to the SPQ immediately. In the SPQ it will wait for a maximum of Q flit-times before being granted access to the link. Thus it makes its deadline, which is bounded by a maximum link access time of Q flit-times.

Now consider on Q, a flit A which was granted access to the SPQ immediately thus making its deadline, and a flit B following flit A, also on Q. Flit B arrives tinterval flit-times after flit A. Flit A was waiting 0 flit-times for access to the SPQ, and a maximum of Q flit-times in the SPQ. A maximum of N−Q flits, the number of VCs of lower priority than Q, were waiting in the SPQ when flit A was granted access to the link. According to the ALG discipline, these must all be transmitted before the next flit on Q is granted access to the SPQ. In a worst case scenario, a maximum of Q−1 flits, the number of VCs of higher priority than Q, can take priority over the N−Q flits that must be transmitted before the admission control of Q admits flit B to the SPQ. The sum of these partial delays indicate the maximum time that can pass between one flit on Q and the following being admitted to the SPQ, Q+(N−Q)+(Q−1)=N+Q−1. This means that if tinterval≧N+Q−1 flit-times, then the flit B will be sure to be granted access to the SPQ immediately, and waiting a maximum of Q flit-times in the SPQ, it too will make its deadline. Thus, under the interval condition, since any flit following a flit which made its deadline will itself make its deadline, and since the first flit makes its deadline, by induction all flits will make their deadlines.

We now show that, for a sequence of ALG links, even if the interval condition is invalidated locally, due to jitter being introduced in the network, ALG ensures that all flits make their deadlines at each link. Thus the end-to-end latency bound is the sum of the latency bounds at each link. At this point, we are still assuming that there is always enough buffer space in the nodes. In Section 5 we strengthen the proof, calculating the buffer requirement.

The Sequence of Links Corollary: Under the assumption that there is always enough buffer space, for a given connection having reserved VCs Q1, Q2, ..., QX on a sequence of X ALG links each implementing N VCs, the latency bound is the sum of the latency bounds at each link, under the condition that a flit interval of tinterval≧N+Qmax−1 flit-times is respected at the source. Here, Qmax is the maximum of {Q1, Q2, ..., QX}.

Proof: Consider a link on the connection in question, on which VC Q ∈ {Q1, Q2, ..., QX} has been reserved, and a flit A on the connection, which has made its deadline on that link. Since the flit made its deadline, according to the proof of the Single Link Theorem above, the admission control will open for admission to the SPQ of a proceeding flit B, on the same VC, a maximum of N+Q−1 flit-times after flit A was granted access to the SPQ. Since flit A made its deadline, it was on or ahead of its schedule. If flit B is further ahead of its schedule than flit A, it will arrive less than N+Q−1 flit-times after flit A was granted access to the SPQ, and the admission control might not grant it access to the SPQ immediately. At the latest N+Q−1 flit-times after flit A was granted access, flit B will be sure to be granted access. Their separation at the source was N+Qmax−1 flit-times. It will be this or less now, so flit B will be at least as far ahead of its schedule as flit A. Thus it will also make its deadline. If flit B on the other hand is less ahead of its schedule than flit A—due to congestion at an earlier stage in the network—it will arrive more than N+Qmax−1 flit-times after flit A was granted access to the SPQ. It will thus be granted access immediately, and make its deadline.

The first flit transmitted on a connection makes its deadline, since it is not stalled in the admission control of any link. Since any flit, following a flit making its deadline, will itself make its deadline, by induction all flits on the connection will make their deadlines, at all links.

The minimum sustainable BW follows from this:

The Minimum Bandwidth Corollary: On a given connection which has reserved VCs Q1, Q2, ..., QX on a sequence of X ALG links each providing a total bandwidth of BWlink, and each implementing N VCs, the minimum bandwidth sustained will be BWmin=BWlink/(N+Qmax−1). Here, Qmax is the maximum of {Q1, Q2, ... QX}.

Proof: According to the Sequence of Links Corollary, all flits on an ALG connection, adhering to the interval condition of tinterval≧N+Qmax−1 flit-times, have a bounded latency. Thus a stream of flits can be transmitted at a flit rate of at least 1/(N+Qmax−1) of the total flit rate supported by a link, without causing congestion. From this follows directly that the sustainable bandwidth is at least: BWmin=BWlink/(N+Qmax−1).

3. Buffers

In the previous section, we have assumed that flits flow freely in the network, constrained only by the ALG link access scheduling discipline. Since this work targets lossless networks, in which flits are never dropped, each link must also implement back pressure flow control, ensuring that a flit can only be transmitted on a VC if the receiving end has free buffer space. This introduces an extra layer of admission control, the VC control shown in FIG. 3. The VC control wraps around the ALG admission control and the SPQ, only letting flits through if the receiving VC buffer indicates that it has free space. A flit must only be presented to the ALG admission control if it can move freely to the receiving end of the link. Otherwise the latency guarantees provided by the ALG discipline may be invalidated, by flits stalling on the link. On the other hand, a flit must not be unduly delayed by the VC control, so that it is caused to miss its deadline, again invalidating the ALG latency guarantees.

Figure 6:
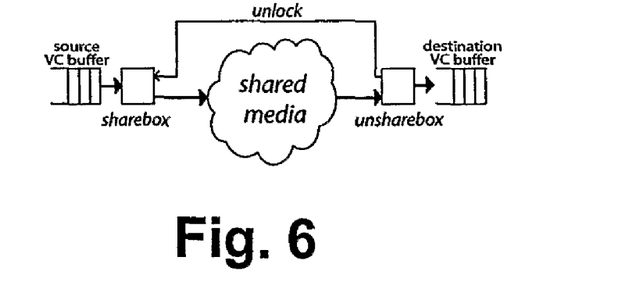
FIG. 6 illustrates share-based VC control.

In this work we employ share-based VC control. The scheme, illustrated in FIG. 6, uses a single wire per VC to implement non-blocking access to a shared media, e.g. a link. After admitting a flit the sharebox locks, not allowing further flits to pass. The flit passes across the media, to the unsharebox at the far side. The unsharebox implements a latch, into which the flit is accepted. When the flit in turn leaves the unsharebox, the unlock control wire toggles. This unlocks the sharebox, admitting another flit to the media. As long as the media is deadlock free, no flit will stall within it.

Figure 5:
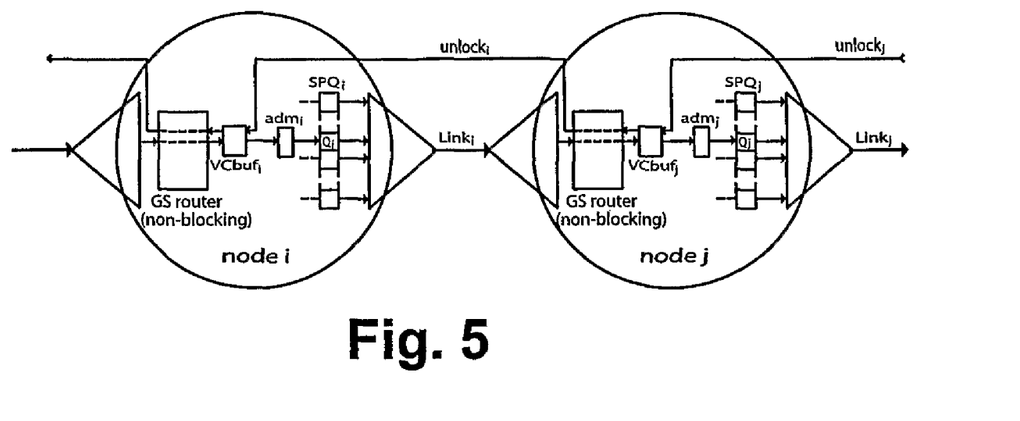
FIG. 5 is a model of a section of a sequence of VCs reserved by a connection.

As illustrated in FIG. 5, we model a connection as a sequence of ALG links, with a direct circuit between the input port and the VC buffer reserved for the connection. This assumption is valid for a router architecture F which implements and non-blocking switching. The VC buffers in the figure implement unshare- and shareboxes on their inputs and outputs respectively. Latencies involved are the link access latency taccess which is the time it takes for a flit to be granted access to the link, the link forwarding latency tlink which is the latency of a flit across the link, through the router and into the next VC buffer, once link access has been granted, and the unlock latency tunlock which is the time it takes for the unlock signal to travel back to the sharebox in the previous VC buffer, indicating that another flit can be granted access to the link. All latencies apart from the link access latency are constant, as no congestion occurs. The end-to-end latency bound of a connection consisting of a sequence of X ALG links, each implementing N VCs, is similar to ttotal introduced in Section 3: tend2end=taccess1+tlink1+taccess2+tlink2+ . . . +taccessX+tlinkX. For simplicity N is herein considered to be the same on all links. The link access time is determined by the priority, $Q_1, Q_2, \ldots, Q_X$, of the VC reserved at each link: taccess1=Q1 flit-times, taccess2=Q2 flit-times, etc. The maximum Q on the connection, Qmax, dictates the BW guarantee of the connection, according to Section 4.3, since this is the bottleneck of the path: BWmin=BWlink/(N+Qmax−1).

We now need to determine the requirements for the sharebox to always be unlocked when a flit matures for access to the SPQ, i.e. when it is 0 time ahead of its schedule. If this is so, the flit will be presented to the ALG admission control, and according to the ALG discipline, it will make its deadline. In the following, we will prove that under the flit interval condition and the link cycle condition that tlink+tunlock<N−1 flit-times, a single element VC buffer is enough to allow the ALG scheduling discipline to function properly.

The Single Buffer Theorem: Under the flit interval condition tinterval≧N+Qmax−1 flit-times and the link cycle condition tlink+tunlock<N−1 flit-times, a single element flit buffer, for each VC in each node, is enough to ensure the validity of the Sequence of Links Corollary.

Proof: As illustrated in FIG. 5, consider a section of a connection having reserved VCs ( . . . , Qi, Qj, . . . ) on a sequence of ALG links, each implementing N VCs. The VC buffers VCbufi and VCbufj each have buffer space for one flit. At reset they are empty, thus the first flit transmitted on the connection is not limited by VC control, and will according to the ALG discipline make its deadline. Now consider a flit B following a flit A which is making its deadlines. Since flit A is making its deadlines, it will gain access to SPQj latest at a time 0 which corresponds to it being 0 time ahead of its schedule. At this time VCbufj will signal VCbufi that it is ready to accept another flit. Thus VCbufi will open its output for the next flit, flit B, at a time tunlock later. Flit A must have left SPQi no later than at time 0−tlink, thus adm1 will allow flit B to enter SPQi no later than 0−tlink+N−1=N−1−tlink flit-times. If this time is later than the time VCbufi lets flit B through, then VCbufi will not be the limiting agent of the flow. The requirement for the VC control not to be the limiting agent in the system is thus: N−1−tlink>tunlock=>tlink+tunlock<N−1 flit-times. This constitutes the link cycle condition. If the link cycle condition holds, flit B will arrive at VCbufj at a time: Q1+tlink+N−1−tlink=Q1+N−1 flittimes, which is less or equal to the required flit interval of Qmax+N−1 flit-times. Thus flit B made its schedule in arriving at admj.

Under the interval condition of a minimum flit interval of Qmax+N−1 flit-times at the source, and under the link cycle condition that tlink+tunlock<N−1 flit-times, any flit following a flit which made its deadline will also make its deadline. Since the first flit makes its deadline, by induction all flits on the connection make their deadlines.

4. Bandwidth Allocation

In its basic form, as described up till now, an ALG link provides flexible latency guarantees. A VC can be chosen of which the priority corresponds to the latency requirements of a connection to be established. The bandwidth guarantees are fixed however, according to the priority of the chosen VC. And amongst the different priorities, the BW is not very different, ranging from 1/N for the highest priority, to 1/(2N−1) for the lowest priority. In the following we will describe three methods for obtaining flexible BW allocation to a connection, while still enjoying the flexible latency guarantees of the basic ALG configuration.

The first method (the multi-channel method) is trivial: several VCs are allocated at each link to a single connection. This in effect creates a connection which is in fact several connections 'in parallel', and thus with increased data capacity. While the usage can be handled locally at each link, it can also be handled on an end-to-end basis, at the network adapters. The advantages of this method of allocating BW are that it is simple to understand and to implement. Also, the flits arrive in bursts (with little interval). The first X flits, X being the number of VCs allocated for the connection at each link, are transmitted on separate, independently buffered sequences of VCs. Thus the latency of all these can be made very low by choosing high priority VCs. This is a major advantage for small packets, since the entire packet can be given a very low total latency guarantee. In a network with bus-type (memory mapped) access sockets such as OCP interfaces, most packets transporting simple OCP commands would, in a 32-bit network, consist of 2-3 flits. By allocating a number of sequences, or sets, of VCs corresponding to the number of flits in such a packet, the forward latency of these commands is reduced to the ALG latency of the slowest set of VCs allocated. The drawback of this method is the fact that the area requirements of a link increases more or less linearly with the BW granularity, the area being determined mainly by the flit buffers; the BW granularity is roughly inversely linear with the number of VCs, as each VC needs a flit buffer. Also a wide SPQ is required. This reduces the performance of the SPQ, which reduces the flit-time since the SPQ is the bottle-neck of the link, in the presented embodiment.

The second and third methods evolve around the basic concept of allowing more access to one priority—than normally allowed, by the basic ALG admission control scheme—without the need to implement more buffer space. Thus one VC will be allowed access to the SPQ more often, and thus the throughput of this VC will increase. The total latency of a multi-flit packet on the connection however, is higher than for the first method, since the flits cannot commence independently. They use the same sequence of buffers through the network, thus they will have a separation on the connection which is not negligible, due to the fact that a flit must wait for the preceeding flit to leave the buffer in the proceeding node of the connection.

According to the second method (the multi-admission control method), each VC has a number of admission controls. If any one of these is non-awaiting, a flit can be admitted. The admission control which admitted the flit (if more are non-awaiting, any one of these can be chosen as being 'the one' that admitted the flit) will then—upon transmission of the flit which it has admitted—sample the occupancy of the lower priorities of the SPQ according to the method described previously for the basic ALG scheduling scheme. It is seen that each VC can potentially block the transmission of a lower priority VC once for each admission control stage it implements (or each that is active), and thus accordingly reduces the latency guarantee of these. The latency guarantee of a VC thus relates not to the number of VCs of higher priority, but to the total number of active admission control stages of higher priority VCs. The method corresponds to a flit buffer having access to using two or more different priorities in a basic ALG link, then just choosing which ever is open to admission. However, since the priorities will never be in use simultaneously (since there is only one flit buffer) they will experience an equal latency guarantee, according to the highest of the two priorities they will never block each other).

At each link, a flit can be transmitted only when the flit buffer in the next node is free. That is, a flit can only be transmitted on a link after a preceeding flit has been transmitted on the proceeding link. This gives us the separation condition. Assuming that the flit will not be blocked by the admission control in the next node, i.e. that the flit is not ahead of its schedule, $t\_(separation) = t\_(link) + Q\_(proceeding\_link) + t\_(unlock)$. Notice that unlike the interval condition shown earlier, the separation condition is independent of N. The interval condition still applies for each admission control stage, but it is independent of the separation condition, which applies to the stream of flits on the connection. Thus if a VC implements two admission control stages: if $t\_(interval) \geq 2*t\_(separation)$, we get double BW for the given VC. This corresponds to the link cycle condition of Section 5. If $t\_(interval) < 2*t\_(separation)$, less than twice the BW will be guaranteed, because the flits will experience a tighter restriction by the separation condition than by the interval condition. Thus the maximum bandwidth attainable is determined by the link cycle condition, and 'balancing' a multiple of this condition by the interval condition.

Notice the Q mentioned here is not equivalent to the priority of the SPQ, rather it is a Q calculated according to the total number of active admission control stages of higher priority VCs, plus one.

According to the third method (the counting admission control method), the admission control stage will not sample the occupancy (and subsequently close access, if there are any VCs of lower priority waiting) every time a flit is transmitted on its priority, but only every Xth time. In effect, a burst of flits can be transmitted every time the admission control opens (becomes non-awaiting). After the last flit of the burst, the admission control closes off, samples the occupancy of lower priority VCs, and waits for those that are occupied by waiting flits to transmit. Thus each flit of a lower priority VC potentially has to wait X times for this particular (higher priority) VC. Its latency guarantee will be reduced accordingly. Like for the multi-admission control method, an increase in the bandwidth available to a VC is obtained, at the expense of the latency of VCs of lower priority.

5. Implementation

According to FIG. 3, a basic ALG link consists of three basic subsystems: VC control, admission control and SPQ.

5.1. VC Control

Figure 7:
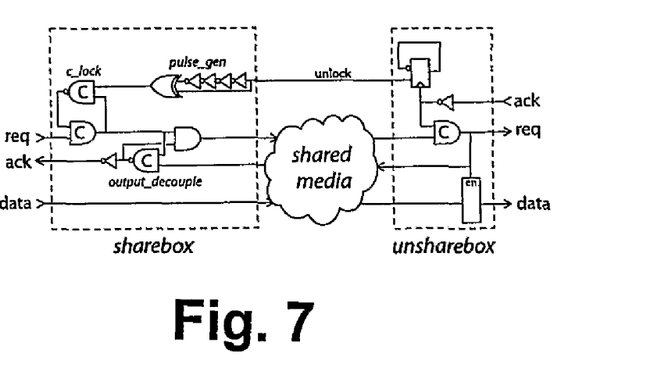
FIG. 7 illustrates share- and unsharebox schematic.

The functionality of the VC control scheme employed—was described in Section 4. FIG. 7 shows the schematic for our implementation of the share- and unshareboxes of one VC. The single wire unlock signal functions as a 2-phase acknowledge. The pulse generated by pulse_gen must be long enough to reset the C-element c_lock. The output_decouple circuit at the output of the sharebox decouples the shared media from the VC. Thus a free flow of flits is ensured, regardless of individual VCs being slow.

5.2. Admission Control

The novelty of ALG scheduling lies in the admission control stage, which controls the flow of flits, allowing the SPQ to provide appropriate latency bounds.

Each channel of the admission control implements a status register of one bit for each channel of lower priority. When one or more of the status bits of a given channel are set, the admission control stops admission of flits, to the SPQ, on that channel. When a flit on the channel is granted access to the link, the status bits are set according to a snapshot of the occupancy of the SPQ. The occupancy indicates which channels that have flits waiting in the SPQ, while the given channel is granted access to the link (being prioritized). The status bits are subsequently reset as these waiting flits are granted access to the link. When all have been transmitted, the status bits are all clear, and the admission control admits another flit on the given channel.

Figure 8:
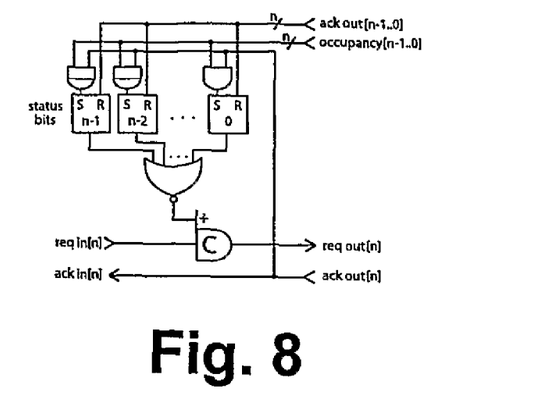
FIG. 8 illustrates admission control schematic.

FIG. 8 shows the schematic of the admission control for channel n. The status bit registers [n−1 . . . 0], one for each lower priority channel, are implemented as RS-latches. Consider channel n as being the highest priority channel contending for access to the link at a given time. The SPQ generates the occupancy vector, and its value is stable while the acknowledge of n is high. The set inputs of a status bit registers is a logical AND of n's acknowledge and the occupancy vector. This way the appropriate status bits are set according to the occupancy of the SPQ when the channel is granted access to the link (indicated by its acknowledge going high). The reset inputs of the status bit registers are simply connected to the acknowledge signals of the corresponding channels. When a channel is granted access to the link, its acknowledge goes high, and accordingly the status bit corresponding to this channel, in the admission control of each of the higher priority channels, is reset. When all status bits are low, the input request is allowed to propagate to the output. Since the local acknowledge causes the status bits to be set, a C-element—rather than an AND-gate—is needed in the request path. This ensures that the output request is not lowered until the input request is lowered.

Note that set and reset of the status bit registers are mutually exclusive, since only one channel can gain access to the link at a given time.

5.3. Static Priority Queue

Figure 10:
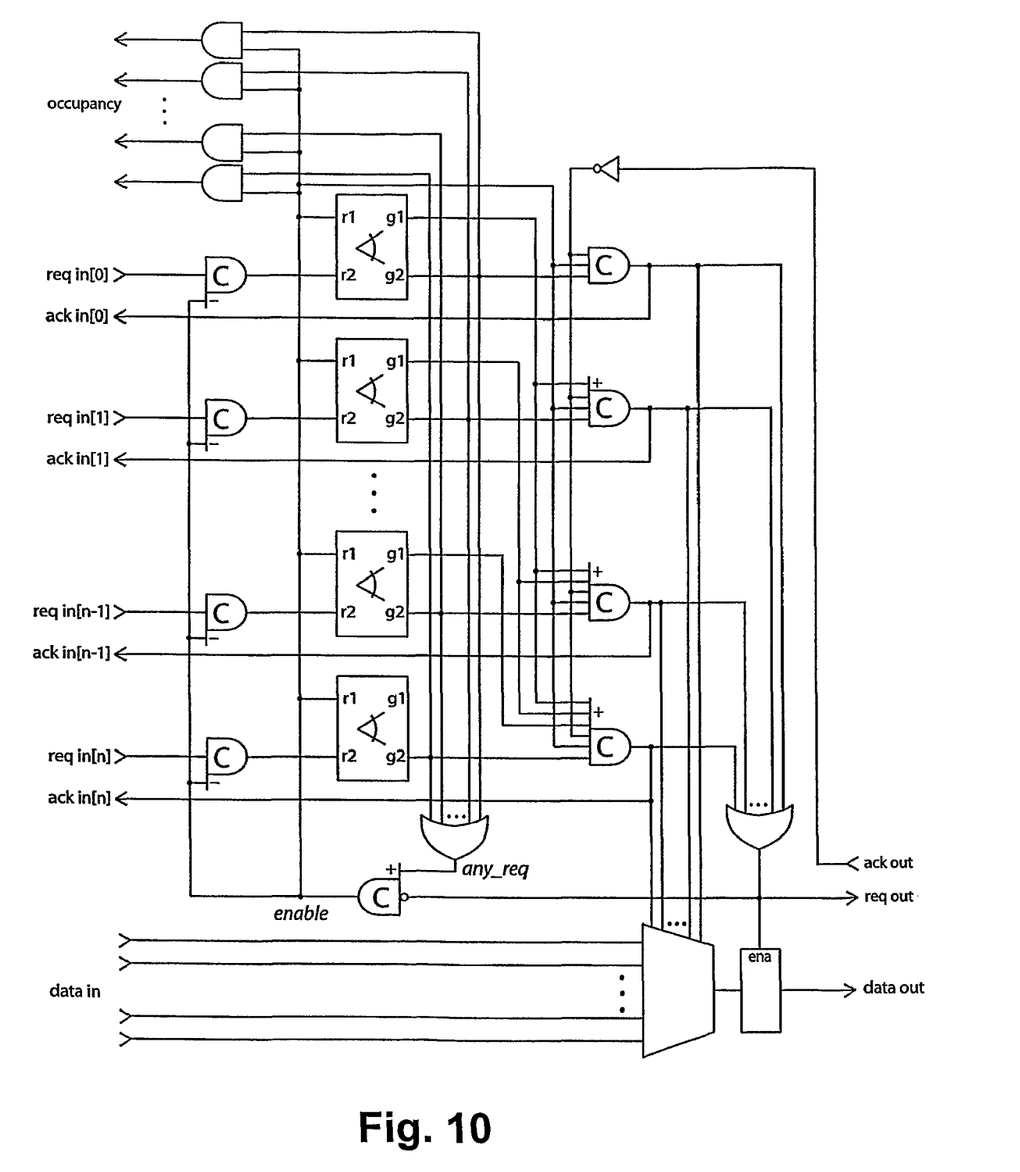
FIG. 10 illustrates a preferred asynchronous implementation of the SPQ arbiter and the accompanying merge data path.

Our asynchronous implementation of the SPQ arbiter and the accompanying merge data path are shown in FIG. 10. The key control signal is 'enable'. At reset, 'enable' is low. The asymmetric C-elements at the inputs ensure that the internal request signals are not lowered while 'enable' is high, as this indicates the active phase of the arbiter. The mutex's implement so called lock registers. When one or more input requests have propagated through to the output of these, this is detected by the OR-gate generating 'any_req', causing enable to go high. This in turn causes the lock registers to lock, and as long as 'enable' is high, newly arriving input requests are blocked. Hereafter exactly one of the output C-elements fires, the appropriate channel is acknowledged, and the data of that particular channel is captured in the output latch. Now 'enable' is lowered, indicating the end of the prioritization phase. As long as 'enable' is low, none of the output C-elements can fire, but once the acknowledged channel withdraws its request, and the link has acknowledged the output request, the corresponding C-element resets, causing 'enable' to start another prioritization phase.

By assuming that the 'g1' outputs of the mutex's are not exceedingly slower than the 'g2' outputs, we realize a fast RTZ phase. All that is required to RTZ is for the 'r2' input of the prioritized channel to propagate through 'g2' to the output C-elements. As long as 'g1' is lowered before the lowered 'g2' propagates through the output C-element, back to the input and re-fires enable, the assumption is safe. Both RTZ timing paths containing 'g1' and 'g2' start with 'enable' going low. The cycle of the SPQ only increases by three 2-input gate depths (app. 30-40 ps in a 0.12 micrometer technology) at every doubling of the number of VCs—one in the asymmetric C-elements and two in the completion detecting OR-gate.

The occupancy vector, used by the admission control to set its status bits, constitutes a logical AND of enable and the locked input requests. As indicated in the last section, this vector is required to be stable while acknowledge is high. By AND-Ing the locked request vector with enable, it is ensured that the bits of the occupancy vector are stable or low when the acknowledge is high. This is good enough, since the status bit registers are set by a high occupancy bit.

6. Results

A 16-bit, 8-VC ALG link was implemented using commercially available 0.12 μm CMOS standard cells. Applying typical timing parameters, the design simulates at a speed of 702 MDI/s, corresponding to a flit-time of 1.4 ns. The shared, physical link implements a 3-stage pipeline. The cell area, i.e. pre-layout, of the entire link was 0.012 mm$^2$, the core of the ALG scheduler (the admission control and the SPQ) taking only 0.004 mm2. This shows that the benefits of ALG are not at all costly in terms of area.

Figure 9:
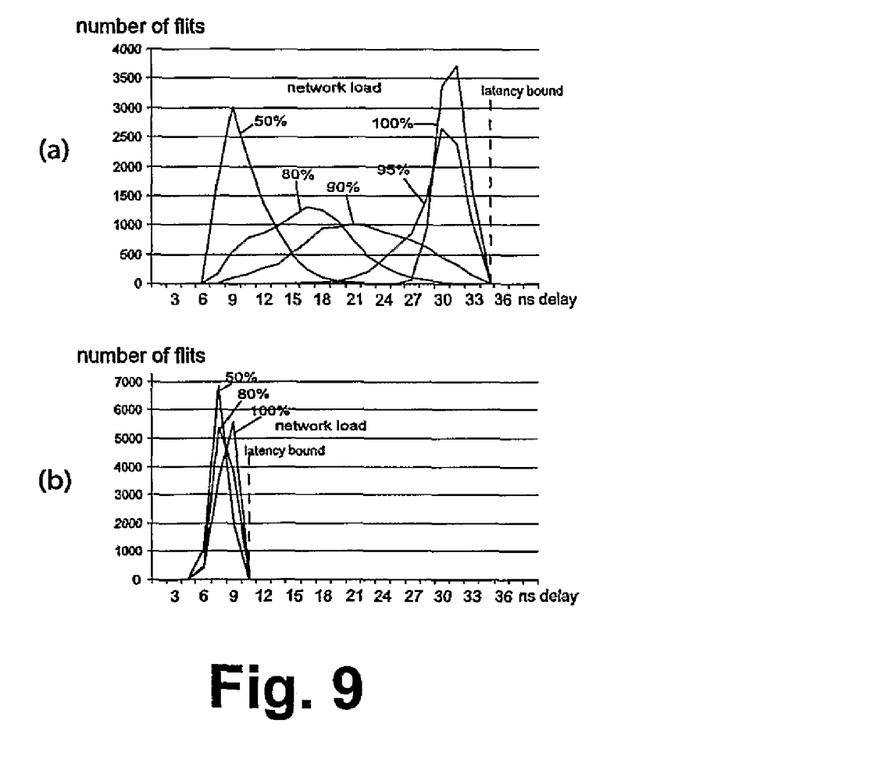
FIG. 9 illustrates flit latency distribution versus network load: (a) slow path, (b) fast path

A test setup emulating connections on a sequence of three ALG links was simulated. Two connections were observed; a fast connection reserving high priority VCs, and a slow connection reserving low priority VCs. The latencies of flits were recorded while random background traffic was induced on all other VCs. FIG. 9 shows the distribution of flit latencies for different network loads, recorded over 10000 flits. It is seen how even at 100% network load, the flits on the connections make their deadlines. As the network load is increased, the latency distribution graph pushes up against the latency bound, but never crosses it. Forward latency bounds from 3.6 ns/hop upwards, in increments of 1.4 ns (one flit-time), are obtainable. This includes the ALG access latency and the constant forward latency across the link (sharebox, merge, pipeline, split and unsharebox—app. 2.2 ns). The BW guarantee on the fast connection was 1/8*702MDI/s=88 MDI/s, while it was 1/15*702MDI/s=47MDI/s on the slow one.

Table 1 compares the guarantees of ALG to those of existing scheduling schemes used in NoC. In the table, N is the number of VCs on each link and h is the number of hops spanned by a given connection. TDM is used in synchronous NoCs, and provides bounds on the connection latency down to N+h, given that some sort of end-to-end flow control is implemented. If not, the latency bound is reduced to the level of asynchronous fair-share, i.e. (N+1)*h. The table shows that ALG provides far better bounds on latency, and that it is generally more flexible in terms of variety of types of connections that can be instantiated.

TABLE 1

Latency and bandwidth guarantees of different GS schemes.

| | Synchronous | Asynchronous | | |
|---|---|---|---|---|
| | TDM | fair-share | ALG fast path | ALG slow path |
| $t_{admit}$ | N | 0 | 0 | 0 |
| $t_{access}$ | 1 | N | 1 | N |
| $t_{link}$ | 1 | 1 | 1 | 1 |
| Latency | N + h | (N + 1)*h | h | (N + 1)*h |
| Bandwidth | 1/N | 1/N | 1/N | 1/(2N − 1) |

The invention claimed is:

1. A method of controlling access to a shared resource, the method comprising:
   receiving information relating one or more data items to be transmitted, each data item having assigned thereto one of three or more different, predetermined priorities, and
   repeatedly providing items to the resource by:
   transmitting, at a first point in time, a data item to be transmitted having a highest, non-awaiting priority to the resource, and
   that priority subsequently awaiting a transmission of a data item from each lower priority which was non-awaiting at the first point in time and for which information, relating to a data item to be transmitted, has been received.

2. A method according to claim 1, further comprising the step of providing a plurality of queues each relating to one of the priorities, and wherein:
   the receiving step comprises receiving each data item in a queue relating to the priority assigned to the data item,
   the transmitting step comprises transmitting the data item from a non-awaiting queue having the highest priority, and
   the awaiting step comprises that queue then awaiting a transmission of a data item from all non-empty, non-awaiting queues having a lower priority.

3. A method according to claim 2, wherein the awaiting step comprises forwarding, when a data item from each non-awaiting, lower priority has been transmitted from a data provider to the shared resource, a next data item from the queue to a memory, and wherein the transmitting step comprises transmitting that data item in the memory having the highest priority.

4. A method according to claim 1, further comprising the step of providing a plurality of data providers each being adapted to:
provide data items each having assigned thereto one of the priorities,
provide information relating to one or more data items ready to be transmitted from the data provider to the shared resource, and wherein:
the transmitting step comprises a data provider transmitting the data item to the resource and
the awaiting step comprises preventing transmission of ready data items, having the awaiting priority, from any data provider, until a data item from each non-awaiting, lower priority has been transmitted from a data provider to the shared resource.

5. A method according to claim 4, wherein the data providers are adapted to forward data items when instructed accordingly, and wherein:
the transmitting step comprises instructing a data provider, having a ready data item of the highest, non-awaiting priority, to forward the data item to the shared resource and
the awaiting step comprises not instructing data providers having a ready data item of the awaiting priority to transmit any data items of the awaiting priority.

6. A method according to claim 1, wherein the receiving step comprises receiving the data items and providing the data items into a storage or memory, and wherein the transmitting step comprises transmitting the data item from the storage or memory.

7. A method according to claim 1, wherein the shared resource is a link, a memory, a processor, an integrated circuit or a crossbar.

8. A method according to claim 1, wherein the awaiting step for a predetermined priority comprises awaiting the transmission(s) of the data item(s) only when the predetermined priority has transmitted a plurality of data items.

9. A method of controlling access to a shared resource, the method comprising:
receiving information relating one or more data items to be transmitted, each data item having assigned thereto one of three or more different, predetermined priorities,
defining, for each priority, one or more transmission processes, each piece of information relating to a data item being assigned a transmission process of the pertaining priority, and
repeatedly providing items to the resource by:
transmitting, at a first point in time, to the resource, a data item, information relating to which has been assigned to a non-awaiting transmission process defined for a highest priority, and
that transmission process subsequently awaiting a transmission of a data item from each lower priority to which information, relating to a data item to be transmitted, has been assigned, and of which at least one transmission process is non-awaiting at the first point in time.

10. A method according to claim 1, wherein the priority/queue/transmission process awaits transmission of a data item only of which information has been received at the point of time of transmission of the data item transmitted at the point in time.

11. A system for controlling access to a shared resource, the system comprising:

receiving means adapted to receive information relating one or more data items to be transmitted, each data item having assigned thereto one of three or more different, predetermined priorities, and
transmitter means adapted to repeatedly have data items provided to the resource by:
having a data item to be transmitted, and having a highest, non-awaiting priority, transmitted to the resource and
subsequently having a transmission of a data item from that priority wait until a data item has been transmitted with each of the non-awaiting, lower priorities for which information, relating to a data item to be transmitted, has been received at a point of time of transmission of the data item.

12. A system according to claim 11, further comprising a plurality of queues each relating to one of the priorities, and wherein:
the receiving means is adapted to provide each data item into a queue relating to the priority assigned to the data item,
the transmitter means is adapted to transmit the data item, having the highest, non-awaiting priority, from that of any non-awaiting queues having the highest priority, and subsequently have that queue await a transmission of a data item from all non-awaiting queues relating to a lower priority.

13. A system according to claim 12, wherein the transmitter means are adapted to forward, when a data item from each non-awaiting, lower priority has been transmitted from a queue to the shared resource, a next data item from the queue to a memory, and to transmit that data item in the memory having the highest priority to the resource.

14. A system according to claim 11, further comprising a plurality of data providers each being adapted to:
provide data items each having assigned thereto one of the priorities, and
provide the information relating to one or more data items ready to be transmitted from the data provider to the shared resource,
wherein the transmitter means is adapted to instruct a data provider to transmit the data item, having the highest, non-awaiting priority, to the resource and to subsequently prevent transmission of ready data items having the awaiting priority from any data provider, until a data item from each non-awaiting, lower priority has been transmitted from a data provider to the shared resource.

15. A system according to claim 14, wherein the data providers are adapted to forward data items when instructed accordingly, and wherein the transmitter means is adapted to instruct a data provider, having a ready data item of the highest, non-awaiting priority, to forward the data item to the shared resource and subsequently not instruct data providers having a ready data item of the awaiting priority to transmit any data items of the awaiting priority, until the data providers have been instructed to transmit a data item from each non-awaiting, lower priority.

16. A system according to claim 11, wherein the receiving means is adapted to receive the data items and providing the data items into a storage or memory, and wherein the transmitter means is adapted to transmit the data item from the storage or memory.

17. A system according to claim 11, wherein the shared resource is a link, a memory, a processor, an integrated circuit, or a crossbar.

18. A system according to claim 11, wherein the transmitter means are adapted to have a priority await only after a plurality of data items from the priority have been transmitted to the resource.

19. A system for controlling access to a shared resource, the system comprising:
   receiving means adapted to receive information relating one or more data items to be transmitted, each data item having assigned thereto one of three or more different, predetermined priorities,
   for each priority, one or more transmission processes, each piece of information relating to a data item being assigned a transmission process of the pertaining priority, and
   transmitter means adapted to repeatedly have data items provided to the resource by:
   having a data item to be transmitted, information relating to which has been assigned to a non-awaiting transmission process of a highest priority, transmitted to the resource and
   subsequently having that transmission process subsequently await a transmission of a data item from each lower priority to which information, relating to a data item to be transmitted, has been assigned at a point in time of transmission of the data item and of which at least one transmission process is non-awaiting.

20. A system according to claim 11, wherein the transmitter means is adapted to have the priority/queue/transmission process await transmission only of a data item of which information has been received at the point of time of transmission of the data item transmitted at the point in time.

21. A method according to claim 9, wherein the priority/queue/transmission process awaits transmission of a data item only of which information has been received at the point of time of transmission of the data item transmitted at the point in time.

22. A system according to claim 19, wherein the transmitter means is adapted to have the priority/queue/transmission process await transmission only of a data item of which information has been received at the point of time of transmission of the data item transmitted at the point in time.

\* \* \* \* \*